Patented May 13, 1924.

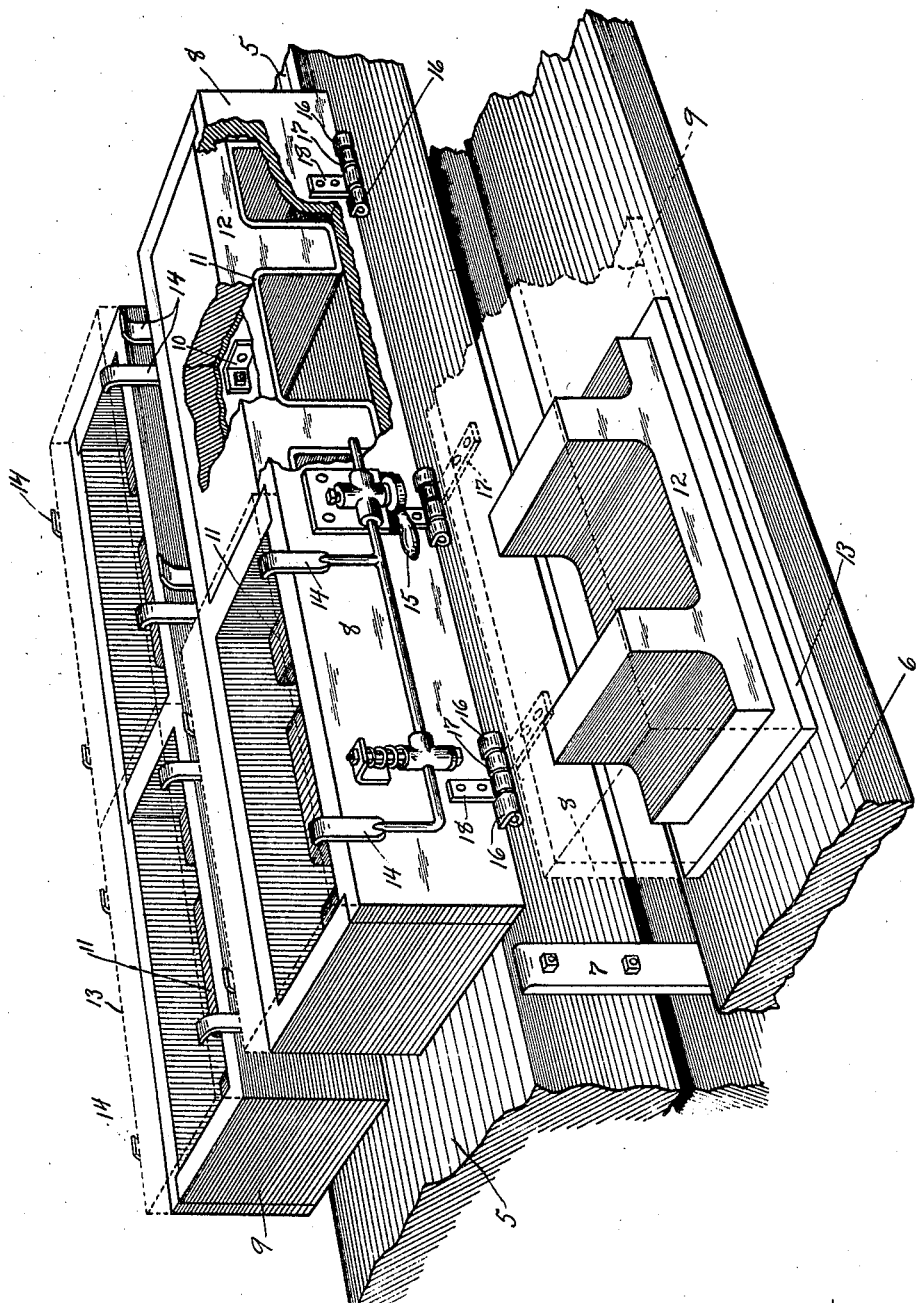

1,493,744

UNITED STATES PATENT OFFICE.

JOHN A. FERGUSON, OF DENVER, COLORADO.

MOLDING BUILDING BLOCKS.

Application filed June 4, 1921. Serial No. 474,887.

*To all whom it may concern:*

Be it known that I, JOHN A. FERGUSON, a citizen of the United States, residing at the city and county of Denver and State of Colorado, have invented certain new and useful Improvements for Molding Building Blocks, and I do hereby declare the following to be a full, clear, and exact description of the invention, such as will enable others skilled in the art to which it appertains to make, use, and carry out the same.

This invention relates to improvements in molding building blocks, or analogous articles, and particularly embodies a novel method of molding as well as improved apparatus for carrying forward the steps thereof.

While the invention has been devised primarily for the purpose of manufacturing concrete building blocks with lateral lugs or projections, it will be understood that I employ the term "concrete" in the sense of including building blocks of equivalent composite material and of any appropriate formation, and whether or not they are to be formed with a facing surface, such as marble, granite, sand or otherwise, as frequently occurs in this art.

It is now generally recognized that better results are obtained when sufficient water is added to the cementitious mixture to provide a highly saturated or wet quaky mass, whereby there is assured a more consolidated or solidified impervious block.

With machines as heretofore employed, for molding such types of concrete building blocks, there has arisen the serious objection that there is formed in the wet quaky mixture larger or smaller interstices, caused by improper settling and air bubbles, which to a certain extent destroy the maximum cohesion of the molecular particles of the mass and hence result in blocks that are very porous, absorptive and otherwise defectively weak.

One of the primary aims of my present invention, therefore, has been to devise a method of and means for overcoming such objection, especially in the multiple molding of blocks in a single cycle of operations, by imparting to the contents of the molding compartment or compartments a pulsating or jerky settling motion, which may conveniently be referred to as "jigging" in the sense of either vertical or horizontal vibratory agitation.

Generically speaking the improvements reside in the provision of a mold form container or containers, having one or a plurality of molding compartments, mounted for jigging to impart a jerky agitating motion thereto, for settling or consolidating the contents thereof. This jigging is effected preferably both while the cementitious mixture is being introduced into its mold form container as well as when the filling operations have been completed, after which the mold is bodily turned over, to be supported in a reversely inverted position on the same jigging table, so that its contents may be correspondingly jigged as finally reversed, for the important reasons set forth.

Other objects and advantages will be so clearly apparent, as incidental to the following disclosure, that it would serve no useful purpose to further enlarge upon the same initially, and with these prefacing remarks reference will be immediately had to the accompanying drawings, illustrating a practical embodiment of an improved apparatus for carrying out the steps of the novel method, in which drawings—

The single view is in perspective and illustrates a plurality of molds arranged in pairs relatively to a suitably supported jigging table, some of the parts being omitted and some of the parts being broken away to clearly show one of the mold forms as associated with its concrete mixture, and the jigging mechanism is also omitted as not being essential for illustration, it being understood that any well known mechanism may be employed for supplying the actuating vertical or horizontal jigging motion, or both.

The numeral 5 indicates the jigging table, which latter additionally provides an offset part or shelf disposed in a lower plane at one side thereof, or at both sides thereof when the molds are arranged side by side as shown in the drawings. This depending part of the table, or side shelf therefor, is indicated by the numeral 6, and is shown as being suspended by means of suitable angle-iron bracket arms 7, as will be apparent.

In a companion case, filed August 8, 1921, under Serial No. 490,675, I have disclosed means for bodily elevating and lowering the mold or molds relatively to the jigging table, for the purpose of bodily reversing the molds within their own zone limits, in order to finally jig their contents in inverted position. By the present arrangement I so pivotally connect the molds to the upper section 5 of the jigging table that they are adapted for bodily folding over to be supported in their inverted positions on the lower shelf of the jigging table, as will later more fully appear.

When a plurality of such mold form containers are arranged endwise only, it may be more desirable to simply provide an elongated mold box having suitable compartments for each block to be molded. Where the molds are arranged side by side, however, then the mold or molds on one side of the jigging table would be hingedly connected along the contiguous edge of that side of the upper table section, while the mold or molds on the other side would likewise be hingedly connected at the opposite side of the table.

The mold form containers are designated at 9, providing an outer foldable side wall 8 associated with the molding compartments, each of which latter contains a suitable core element 11 for molding double lugged building blocks of the form shown at 12.

The concrete mixture for the block 12 shown at the upper rear end of the drawings, however, is broken away to illustrate any suitable means, conventionally indicated at 10, for securing the core element 11 within its complementary compartment, it being understood that these core elements 11 may be of other forms and dimensions, dependent upon the actual size and formation of the blocks to be molded.

The numeral 13 indicates covers for the molds, each of which covers also serves as a removable support for a molded block, and may therefore be appropriately referred to by the term "pallet" or "platen" cover.

Any suitable means may be employed for detachably securing or clamping the pallet covers over the open tops of the molds, and I have simply illustrated conventionally a very satisfactory form of such securing means as comprising a plurality of springy clasp arms or elements 14 suitably supported on the foldable side wall 8, as well as being duplicated at the opposite or rigid side wall, and which clasp arms may be manually operated conjointly at each side by a single actuating lever 15. This clamping mechanism is broken away at the forward right-hand side of the view, but obviously the construction is the same as that shown at the left-hand side.

As before stated, one of these clamping mechanisms is preferably disposed at both sides of each mold form container, although in some instances they could be disposed at the ends of the molds, and still in other instances one of the clamping devices could co-operate with other means for securely clamping the pallet cover down on its particular mold. These details, however, are not essential in their specific forms to the actual invention involved and require no further detailed description, it being observed that the clamping device illustrated may be substituted for by other securing means if deemed expedient.

The molds are so pivotally connected to the upper section 5 of the jigging table that the foldable side walls 8 are caused to be disposed slightly beyond a contiguous side wall of the table in positions for the molds to be bodily swung outwardly and downwardly until they rest in an inverted position on the shelf or table section 6.

This pivotal connection may be made in any suitable way, but I have simply shown a conventional means that consists of hinging connections, each of which may provide separate arms 16—17—18, the outer arms 16 being fixedly attached to the top face of the table section 5, with the arms 17 analogously secured to the bottoms of the molds 9, while the arms 18 are secured to the outer face of a complementary foldable side wall 8.

While it will be understood that the broader principles of my invention would be applicable even with a single mold box, as a matter of fact and in actual practice I aim to employ a plurality of individual mold boxes or one or more mold boxes each having a plurality of compartments for multiple molding in each cycle of operations.

With this understanding, and in carrying out the steps of my method, the molds 9 are first positioned on the upper section 5 of the jigging table, with their open tops disposed upwardly, but with their pallet covers 13 removed and with the spring clasp arms 14 operated to their unlatched positions.

The molds are then filled with the cementitious mixture, the filling thereof preferably occurring while the table is being jigged and thus distributing the mixture evenly within the molds. After this operation, and whether or not a facing material is added as will hereinafter appear, the pallet covers 13 are then placed over the open tops of the molds and securely clamped down thereon by the clasp arms 14.

As thus filled, covered and disposed, the jigging table is then actuated with its jerky agitating motion for a substantially suitable period of time, so that the quaky contents of the molds become more and more consolidated therein, as the excess water and air bubbles are caused to escape.

After a suitable length of time the actuation of the jigging table may be temporarily suspended, whereupon the molds are bodily folded over laterally in order to swing the same into position upon the table section or shelf 6, where they will be supported in an inverted position or with the pallets 13 now resting upon the shelf section 6 as would be indicated in the view, the mold being shown in dotted lines while a pallet 13 and a molded block 12 is shown in full lines.

When the molds are thus supported in their secondary position, the jigging table is again actuated as heretofore described for causing a further jerky motion to the contents of the molds in their inverted positions, which will obviously insure a thorough consolidation of the contents thereof.

After this latter jigging operation has been continued for a sufficient length of time, the body of the block and the facing material have become thoroughly consolidated, where a facing material has been inserted in the molds over the body mixture, and any excess water in the facing mixture will have been substantially exuded.

This final operation having been completed, therefore, and the jigging motion of the table having been stopped, it only remains to actuate the operating levers 15 to release the clasps 14, whereupon the molds are bodily swung upwardly and inwardly to their initial positions on the table section 5, all ready for refilling again, leaving the molded blocks 12 released from their molds and resting on their respective pallets 13, which latter now serve as convenient supports for setting the molded blocks aside until they become thoroughly indurated for commercial use.

It may be further said that this final jigging is also of considerable importance inasmuch as it loosens the ends of the webs of the blocks, making it more feasible to release the molded blocks and discharge them by gravity, as without this final jigging there might be a strong tendency towards the ends of the webs sticking to and being held in the molds, making it necessary to jar or jolt the mold boxes to start the release of the blocks and prevent the ends of the webs from remaining in their molds as the bodies thereof are being discharged.

I have described all of the foregoing with more particular reference to the molding of blocks that are not intended to have a finished facing, although in actual practice the latter may generally be employed, but it will be obvious that where such a facing is desired it will only be necessary to fill the molds up to a limited height or, which is the equivalent, a portion of their contents may be removed with a suitable scraping implement, after the initial filling and jigging operations, whereupon the spaces left interiorly of the top of the molds are filled with the facing material before the molds are reversed for the final jigging operations, which latter causes the consolidation of the face matter with the body of the block, as has before been referred to.

In all cases the steps of the method are practically identical, and it is understood that my invention is intended to be applicable in all such relations. It is also to be understood that, in so far as the broader method claims are concerned, where I speak of the jigging of the contents in inverted or bodily reversed position, I intend to cover such final jigging, whether or not the molds are reversed by bodily folding over, as specifically disclosed herein, or by bodily elevation and lowering, as disclosed in the companion case Serial #490,675 aforesaid, or otherwise.

It is believed that the full advantages of the method disclosed will be quite apparent to those engaged in this particular industry, and it will also be seen that I have devised a simple, durable and effective apparatus for carrying out the steps of the method, and which apparatus is so fundamentally essential to the method itself as to cause the method and the apparatus to be fairly considered as one and the same invention.

Having thus fully set forth my invention, it will be understood that I do not wish to unnecessarily restrict myself to the exact details as disclosed, but what I do claim as new and patentable is:—

1. The method of molding articles from a wet mixture which embodies the steps of introducing said mixture into a suitable mold form container, initially jigging said container and its contents in one position, afterwards jigging the same as turned to another position, and subsequently causing the separation and removal of the molded matter.

2. The method of molding articles from a wet cementitious mixture of the character set forth, which embodies the steps of introducing said mixture into a suitably supported and detachably covered mold form container, jigging said container and its contents for consolidating the latter, subsequently jigging said container and its contents in a bodily reversed position for the further consolidation of the contents, and finally removing said container away from its detachable cover and molded article thereon.

3. The method of molding articles from a wet cementitious mixture of the character set forth, which embodies the steps of introducing said mixture into a suitably supported and detachably covered mold form container, jigging the contents for consolidating the same, subsequently jigging said contents in a bodily reversed position for the further consolidation of same, and finally removing said container away from its detachable cover and molded block thereon, which latter step is conducted in the same zone of occurrence where said final jigging has been effected.

4. The method of molding building blocks from a wet cementitious mixture of the character set forth, which embodies the steps of introducing said mixture into a suitably supported and detachably covered mold form container, jigging said container while introducing said mixture therein for evenly distributing the mixture, clamping pallet covers thereover, subsequently jigging said container as filled and covered for consolidating the contents thereof, subsequently jigging said container and its contents in a bodily reversed position for the further consolidation of the contents, and finally removing said container away from its detachable cover and molded block thereon.

5. The method of molding building blocks from a wet cementitious mixture of the character set forth, which embodies the steps of introducing said mixture into a suitably supported and detachably covered mold form container, introducing a facing mixture over the top of the aforesaid mixture in said container, jigging said container and its contents for settling the latter and consolidating said facing mixture with its body mixture, and subsequently removing said container away from its detachable cover and molded block thereon.

6. The method of molding building blocks from a wet cementitious body mixture of the character set forth, which embodies the steps of introducing said body mixture into a suitably supported and detachably covered mold form container, jigging said container and its contents for settling the latter, subsequently jigging said container and its contents in a bodily reversed position, introducing a facing mixture over the top of the said body mixture in said container anterior to its finally reversed jigging operations, and finally removing said container away from its detachable cover and molded block thereon.

7. The method of molding building blocks which embodies the steps of introducing a quaky body of cementitious mixture into a plurality of suitably supported molds supplied with detachably secured pallet covers, jigging said molds while introducing said body mixture therein for evenly distributing said mixture, introducing a facing mixture over the top of said body mixture, jigging said molds to substantially settle the contents thereof in their initial filling positions, after having secured their pallet covers thereover, subsequently jigging said molds and their contents in bodily reversed positions for the further settling thereof and the consolidation of said facing mixture with its body mixture, and finally removing said molds away from their detachable covers and molded blocks thereon.

8. In apparatus for molding articles from a wet cementitious mixture of the character disclosed, the combination of a suitably supported and actuated jigging table, a mold form container providing an open face, mechanical means for reversibly mounting said container relatively to and upon said jigging table to permit of its being bodily inverted thereon, a removable pallet cover for the open face of said container and also serving as a supporting means for the molded articles when located in its downward position, and means for detachably securing said pallet cover over the open face of said container.

9. In apparatus for molding building blocks from a wet cementitious mixture of the character disclosed, the combination of a suitably supported and actuated jigging table, embodying an upper and a lower section offset relatively to each other, a mold form container for said mixture, providing an open top and adapted to be mounted on said upper table section with its top disposed upwardly, which container is so hung from said upper table section as to be adapted to be swung bodily over upon said lower table section with its top disposed downwardly, a removable pallet cover for the open top of said container and also serving as a supporting means for the molded blocks, and means for detachably securing said pallet cover over the open top of said container.

10. In apparatus for molding building blocks from a wet cementitious mixture of the character disclosed, the combination of a suitably supported and actuated jigging table, embodying an upper and a lower section offset relatively to each other, a mold form container for said mixture, providing an open top and a foldable side wall, adapted to be mounted by said upper table section with its top disposed upwardly, which container is so hung from said upper table section as to be adapted to be swung bodily over upon said lower table section with its top disposed downwardly, a removable pallet cover for the open top of said container and also serving as a supporting means for the molded blocks, and means for detachably clamping said pallet cover over the open top of said container.

11. In apparatus for molding building blocks from a wet cementitious mixture of the character disclosed, the combination of a suitably supported and actuated jigging table, embodying an upper and a lower section offset relatively to each other, a plurality of mold form containers for said mixture, each providing an open top and a foldable side wall, adapted to be mounted by said upper table section with their tops disposed upwardly, which containers are so hung from said upper table section as to be adapted to be swung bodily over upon said lower table section with their tops disposed downwardly, removable pallet means for closing the open tops of said containers and also serving as supporting means for the molded blocks, and means for detachably clamping said pallet covering means over the open tops of said containers.

12. In apparatus for molding building blocks from a wet cementitious mixture of the character disclosed, the combination of a suitably supported and actuated jigging table, embodying an upper section and lower sections at each side of said upper section and offset laterally relatively thereto, a plurality of mold form containers for said mixture, each providing an open top and a foldable side wall, adapted to be mounted by said upper table section with their tops disposed upwardly, which containers are so hung relatively to said table, with their foldable side walls disposed adjacent the side walls of said upper section, as to be adapted to be swung bodily from said upper table section over upon said lower table sections with their tops disposed downwardly, removable pallet means for closing the open tops of said containers and also serving as supporting means for the molded blocks, and means for detachably clamping said pallet means over the tops of said containers.

13. In a machine of the class described, a mold carrying frame adapted to receive and carry a series of molds, said molds adapted to receive the material in one position and be vibrated in the period of the filling of the material and be revolved to an inverted position and again vibrated, with means for holding the said frame in either of the said positions and means for vibrating it in both positions; in combination with carrier boards adapted to cover the molds and means for locking and releasing the said boards in position on the molds.

14. In a device of the class described, a concrete block forming machine having a mold carrying frame adapted to receive various different types of molds, said frame mounted upon an axis in the main frame of the machine and adapted to be revolved in different positions in the said machine, locking means carried by the frame for the purpose of securing to the frame covers for the molds adapted to hold the material in the molds in any position of the said frame; in combination with means for vibrating the main frame of the machine.

15. In a device of the class described, a concrete mold carrying frame mounted on an axis in the main frame of the machine and adapted to be revolved in different positions upon the said axis, carrying boards adapted to be secured to the said mold carrying frame and means for locking and releasing the said boards to the said frame in any position of the said frame; in combination with means for vibrating the said mold carrying frame in any of its positions.

16. In a device of the class described, a mold carrying frame mounted upon an axis in the main frame of the machine and adapted to be revolved on the said axis, carrying boards for the molds carried by the said frame and means for securing the said boards to the said frame composed of bell cranked shafts extending along the sides of the frame and connected to an operating lever mounted on the axis of the frame.

17. In a device of the class described, means for carrying concrete block molds adapted to be filled from an open side, means for covering the molds after the same have been filled means for changing the position of the molds after the covering and means for vibrating the molds before and after each change of position.

18. In a concrete block forming machine, mold carrying devices mounted to be revolved in different positions, means for holding the material in the mold in different positions and means for vibrating the molds and the material therein in a plurality of positions.

In testimony whereof, I affix my signature.

JOHN A. FERGUSON.